US011085706B2

(12) United States Patent
Moon et al.

(10) Patent No.: US 11,085,706 B2
(45) Date of Patent: Aug. 10, 2021

(54) DOUBLE TUBE WITH PETAL SHAPE AND METHOD OF MANUFACTURING THE SAME

(71) Applicant: Pusan National University Industry-University Cooperation Foundation, Busan (KR)

(72) Inventors: Young-Hoon Moon, Busan (KR); Sangwook Han, Busan (KR); Taewoo Hwang, Busan (KR); Youngyun Woo, Busan (KR); Ilyeong Oh, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 147 days.

(21) Appl. No.: 16/682,364

(22) Filed: Nov. 13, 2019

(65) Prior Publication Data

US 2021/0108862 A1  Apr. 15, 2021

(30) Foreign Application Priority Data

Oct. 11, 2019  (KR) .......................... 10-2019-0126097

(51) Int. Cl.
*F28F 1/06* (2006.01)
*F28D 7/10* (2006.01)
(Continued)

(52) U.S. Cl.
CPC ................ *F28F 1/06* (2013.01); *B23P 15/26* (2013.01); *F28D 7/106* (2013.01); *B21D 26/051* (2013.01);
(Continued)

(58) Field of Classification Search
CPC ..... B23P 15/26; B21D 26/051; B21D 26/041; F16L 9/00; F16L 9/006; F28F 1/06; F28F 2255/10; F28F 2255/14; F28D 7/106
(Continued)

(56) References Cited

U.S. PATENT DOCUMENTS 4,332,073 A * 6/1982 Yoshida ................ B21C 37/154
138/140
4,694,864 A * 9/1987 Libin .................... B21C 37/154
138/113
(Continued)

FOREIGN PATENT DOCUMENTS

JP   2008-232449 A   10/2008
JP       4684070 B2    5/2011
KR   10-2105652 B1    4/2020

OTHER PUBLICATIONS

Korean Office Action for related KR Application No. 10-2019-0126097 dated Jul. 20, 2020 from Korean Intellectual Property Office.
(Continued)

*Primary Examiner* — Jon T. Schermerhorn, Jr.
(74) *Attorney, Agent, or Firm* — Paratus Law Group, PLLC

(57) ABSTRACT

A double tube includes an inner tube having a corrugated petal shape in a wave form in an outer tube. The double tube is manufactured by a method including: inserting the inner tube into the outer tube and coaxially disposing the inner tube and the outer tube; inserting a plurality of petal forming bars into a space between the outer tube and the inner tube and arranging the petal forming bars along a circumferential direction at predetermined intervals; disposing an assembly of the outer tube, the inner tube, and the petal forming bars in a mold of a hydroforming machine; supplying a fluid in the inner tube while applying a pressure to the inner tube in an axial direction to expand the inner tube; and separating the petal forming bars from the space between the outer tube and the inner tube.

3 Claims, 5 Drawing Sheets

(51) Int. Cl.
*B23P 15/26* (2006.01)
*B21D 26/051* (2011.01)

(52) U.S. Cl.
CPC ....... *F28F 2255/10* (2013.01); *F28F 2255/14* (2013.01)

(58) Field of Classification Search
USPC .......................................................... 165/154
See application file for complete search history.

(56) References Cited

U.S. PATENT DOCUMENTS

| | | | | |
|---|---|---|---|---|
| 5,189,790 | A * | 3/1993 | Streubel | B21D 26/051 29/424 |
| 5,898,996 | A * | 5/1999 | Buchanan | B21D 53/06 29/890.052 |
| 6,212,982 | B1 * | 4/2001 | Augustin | B21D 28/28 72/55 |
| 6,254,488 | B1 * | 7/2001 | Hill | B21D 26/051 464/180 |
| 6,484,384 | B1 * | 11/2002 | Gibson | F16C 3/023 29/516 |
| 10,801,647 | B2 * | 10/2020 | Moon | B21D 26/051 |
| 2011/0097596 | A1 * | 4/2011 | Mizumura | B21D 26/033 428/603 |

OTHER PUBLICATIONS

Korean Notice of Allowance for related KR Application No. 10-2019-0126097 dated Aug. 13, 2020 from Korean Intellectual Property Office.

* cited by examiner

DOUBLE TUBE WITH PETAL SHAPE AND METHOD OF MANUFACTURING THE SAME

ACKNOWLEDGEMENT

This work was supported by a National Research Foundation of Korea (NRF) grant founded by the Korean Government (MSIT) (No. 2019R1F1A1060010).

CROSS-REFERENCE TO RELATED APPLICATION

This application claims priority to and the benefit of Korean Patent Application No. 10-2019-0126097, filed on Oct. 11, 2019, the disclosure of which is incorporated herein by reference in its entirety.

BACKGROUND

The present disclosure relates to a double tube and a method of manufacturing the same, and more specifically, to a double tube in which a hydroforming method is used to manufacture an inner tube having a corrugated petal shape in a wave form in an outer tube and a method of manufacturing the same.

Recently, since environmental regulations have become strict and greenhouse gas emission regulations are tightened, the importance of research on high-efficiency, eco-friendly energy/an environmental mechanical system has been emphasized, and the development of high efficiency heat exchanger technology has been required as the most preferable alternative for energy efficiency improvement and savings.

A double tube heat exchanger is one of the representative types of a heat exchanger, and as shown in FIG. 1, the double tube heat exchanger is an apparatus in which fluids having different temperatures respectively flow through a space in the inner tube 2 and an annular space between the inner tube 2 and the outer tube 1 to be heat-exchanged with each other by inserting an inner tube 2 having a small diameter into an outer tube 1 having a large diameter.

Since a material is freely changed according to use environment conditions and a structure is simple and cheap in comparison with other heat exchangers, the double tube heat exchanger is widely used in various industrial fields.

However, an internal flow rate and heat transfer efficiency are degraded in comparison with other heat exchangers due to a limited contact area between two fluids, and the length and diameter of the tube should be increased to increase heat exchange efficiency.

SUMMARY

The present disclosure is directed to providing a double tube in which an inner tube disposed in an outer tube has a corrugated petal shape in a wave form to increase a heat transfer area and a method of manufacturing the same.

According to an aspect of the present disclosure, there is provided a double tube including: an outer tube; and an inner tube coaxially inserted into the outer tube to be installed, and having a corrugated petal shape in a wave form along a circumferential direction.

The outer tube and the inner tube may be formed of a thermally conductive metal, and may be a double tube for heat exchange in which a fluid which flows along a space in the inner tube and a fluid which flows along a space between the outer tube and the inner tube are heat-exchanged.

According to another aspect of the present disclosure, there is provided a method of manufacturing the double tube according to the present disclosure using a hydroforming method, the method including: an operation of inserting the inner tube into the outer tube and coaxially disposing the inner tube and the outer tube (S1); an operation of inserting a plurality of petal forming bars into a space between the outer tube and the inner tube and arranging the petal forming bars along a circumferential direction at predetermined intervals (S2); an operation of disposing an assembly of the outer tube, the inner tube, and the petal forming bars in a mold of a hydroforming machine (S3); an operation of supplying a fluid into the inner tube while applying a pressure to the inner tube in an axial direction to expand the inner tube (S4); and an operation of separating the petal forming bars from the space between the outer tube and the inner tube (S5).

In the operation (S2), a pair of bar holders each having a ring shape and in which a plurality of holes into which both end portions of the petal forming bar are inserted are formed along a circumferential direction at predetermined intervals may be inserted into both sides of the inner tube, and both end portions of each of the plurality of petal forming bars may be supported by a holder.

The petal forming bar may be formed as a round rod-shaped bar having a diameter smaller than or equal to a difference between a diameter of the outer tube and a diameter of the inner tube.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
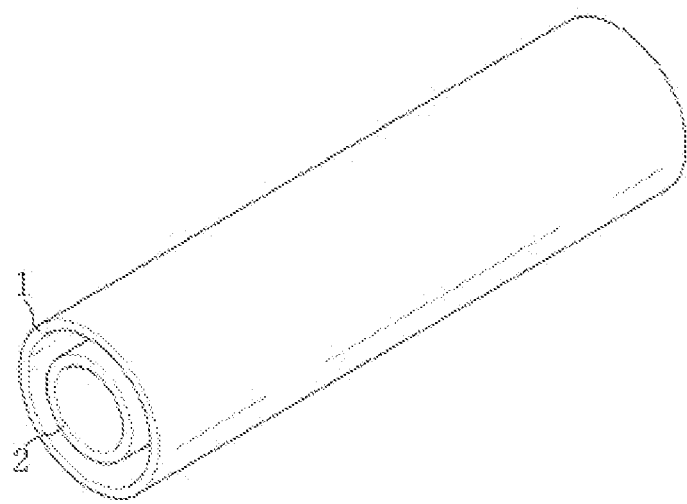
FIG. 1 is a perspective view illustrating an example of a general double tube.

Embodiments disclosed in the specification and components shown in the drawings are preferable examples of the present disclosure, and various modifications which may replace the embodiments of the specification and the drawings may be present at the time of filing the application.

Hereinafter, a double tube having a petal shape and a method of manufacturing the same will be specifically described according to embodiments which will be described below with reference to the accompanying drawings. In the drawings, the same reference numeral refers to the same component.

Figure 2:
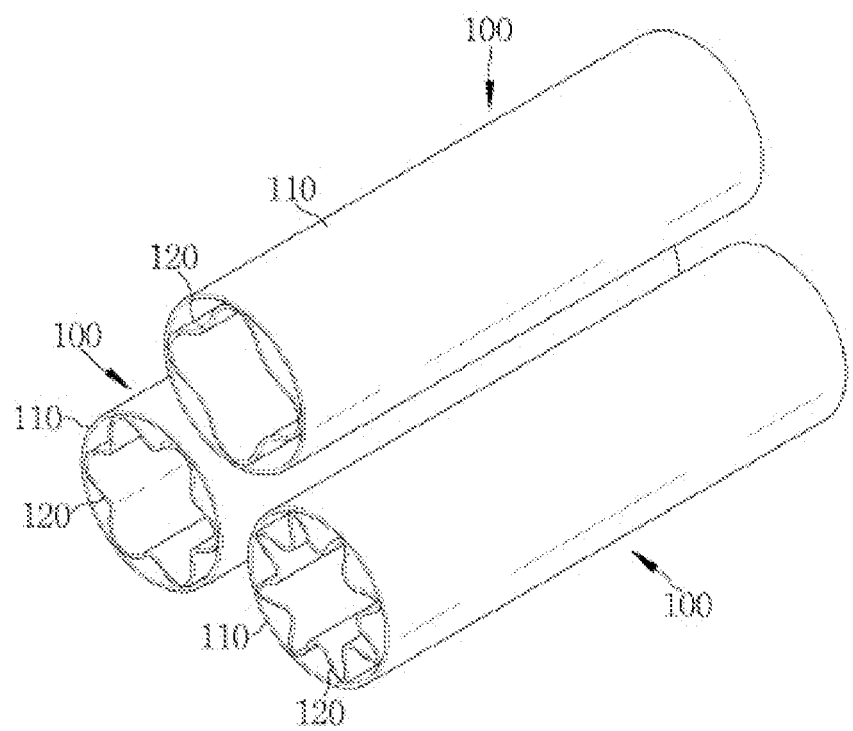
FIG. 2 is a set of perspective views illustrating various embodiments of double tubes according to the present disclosure.
Figure 3:
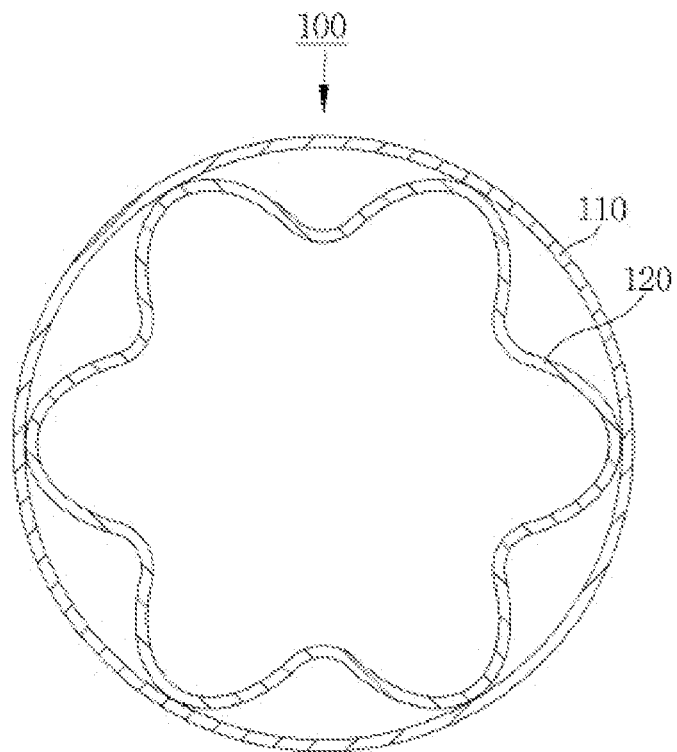
FIG. 3 is a cross-sectional view illustrating a double tube in which six petals are formed among the double tubes in FIG. 2.

FIGS. 2 and 3 illustrate a double tube according to one embodiment of the present disclosure, and the double tube 100 of the present disclosure includes an outer tube 110 having a predetermined diameter, and an inner tube 120 coaxially inserted into the outer tube 110 to be installed, and having a petal shape.

The outer tube 110 is formed as a tube made of a metal material, and the inner tube 120 has an outer diameter smaller than an inner diameter of the outer tube 110 and is formed of a metal. The inner tube 120 is coaxially inserted into the outer tube 110, and has a corrugated petal shape in a wave form along a circumferential direction by a hydroforming process.

The double tube 100 of the present disclosure may be applied to a double tube heat exchanger, and in this case, both the outer tube 110 and the inner tube 120, or at least the inner tube 120 is formed of a thermally conductive metal material, and a fluid having a predetermined temperature moves along a space in the inner tube 120, and a fluid having a temperature greater or lower than that of the fluid in the inner tube 120 flows along a space between the outer tube 110 and the inner tube 120. Accordingly, the fluid which flows through the inner space of the heat conductive inner tube 120 and the fluid which flows through the space between the outer tube 110 and the inner tube 120 are heat-exchanged with each other. In this case, since the inner tube 120 has a corrugated petal shape, an area thereof increases in comparison with a conventional circular inner tube 120 and thus heat exchange efficiency may be improved.

As described above, the double tube having a structure in which the inner tube 120 having a petal shape is inserted into the outer tube 110 may be manufactured through a hydroforming process in which a plurality of petal forming bars 20 (see FIG. 4) are inserted into the space between the outer tube 110 and the inner tube 120 and a fluid is injected into the inner tube 120. The petal forming bar 20 may be formed as a round rod-shaped bar having a diameter smaller than or equal to a difference between a diameter of the outer tube 110 and a diameter of the inner tube 120.

Figure 4:
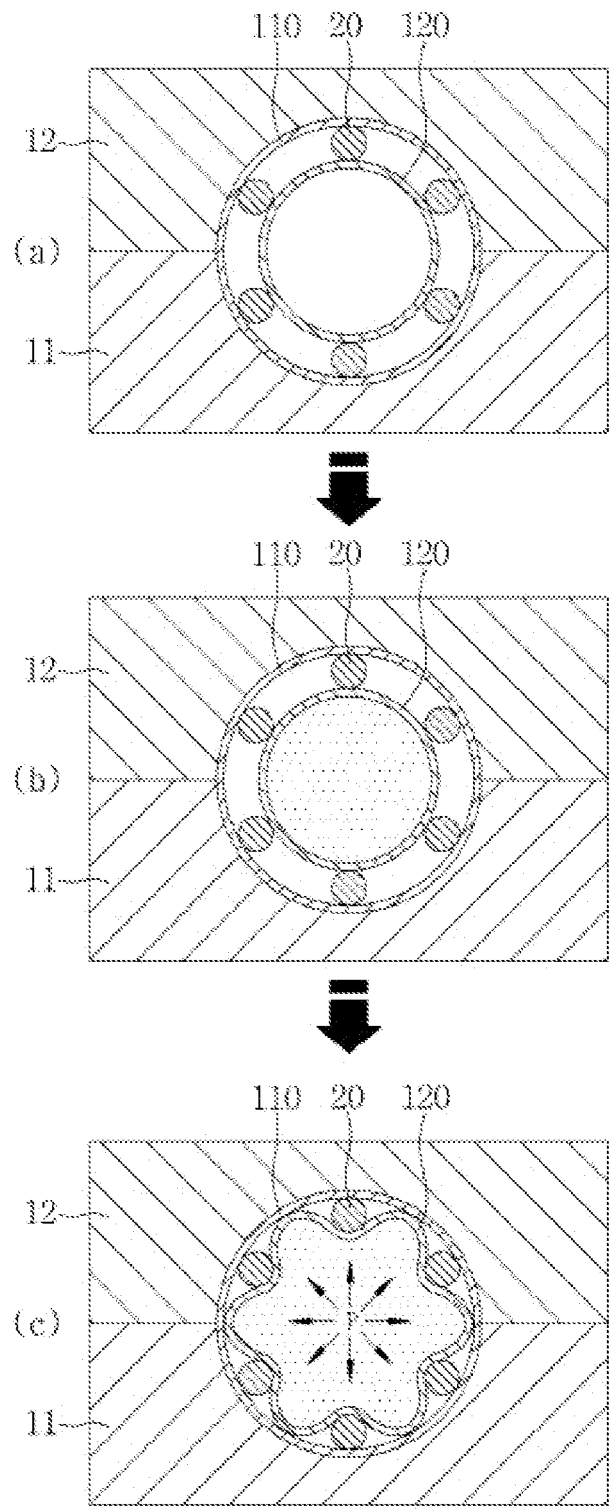
FIG. 4 is a view sequentially illustrating an embodiment of a method of manufacturing a double tube according to the present disclosure.

A method of manufacturing a double tube of the present disclosure will be described in detail with reference to FIGS. 4 to 6.

First, the method of manufacturing a double tube of the present disclosure can be made through the following operations. An operation of inserting an inner tube into an outer tube and coaxially disposing the inner tube and the outer tube (S1).

An operation of inserting a plurality of petal forming bars into a space between the outer tube and the inner tube and arranging the petal forming bars along a circumferential direction at predetermined intervals (S2).

An operation of disposing an assembly of the outer tube, the inner tube, and the petal forming bars in a mold of a hydroforming machine (S3).

An operation of supplying a fluid into the inner tube while applying a pressure to the inner tube in an axial direction to expand the inner tube (S4).

An operation of separating the petal forming bars from the space between the outer tube and the inner tube (S5).

Figure 5:
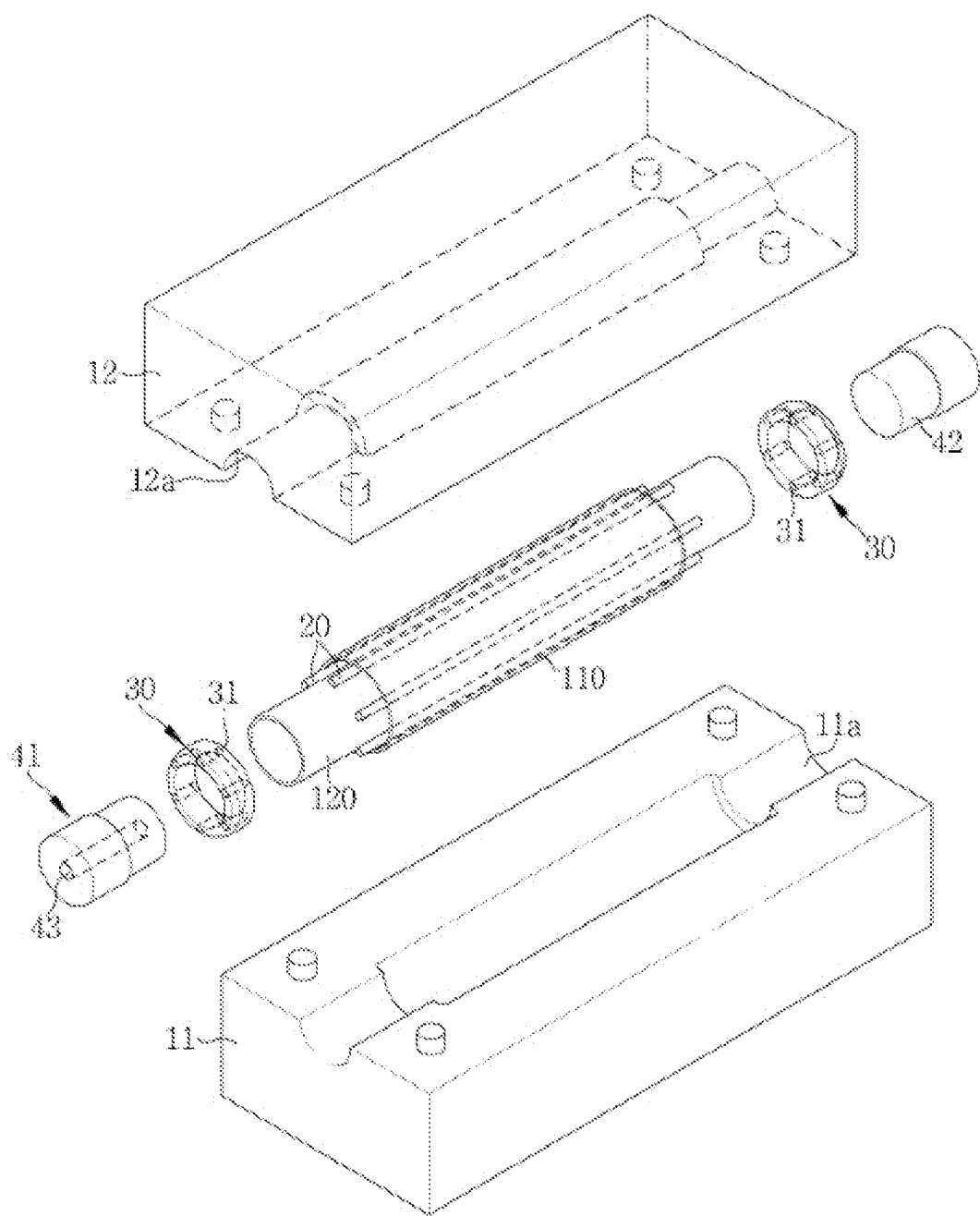
FIG. 5 is a perspective view illustrating a hydroforming machine configured to perform the method of manufacturing a double tube according to the present disclosure.
Figure 6:
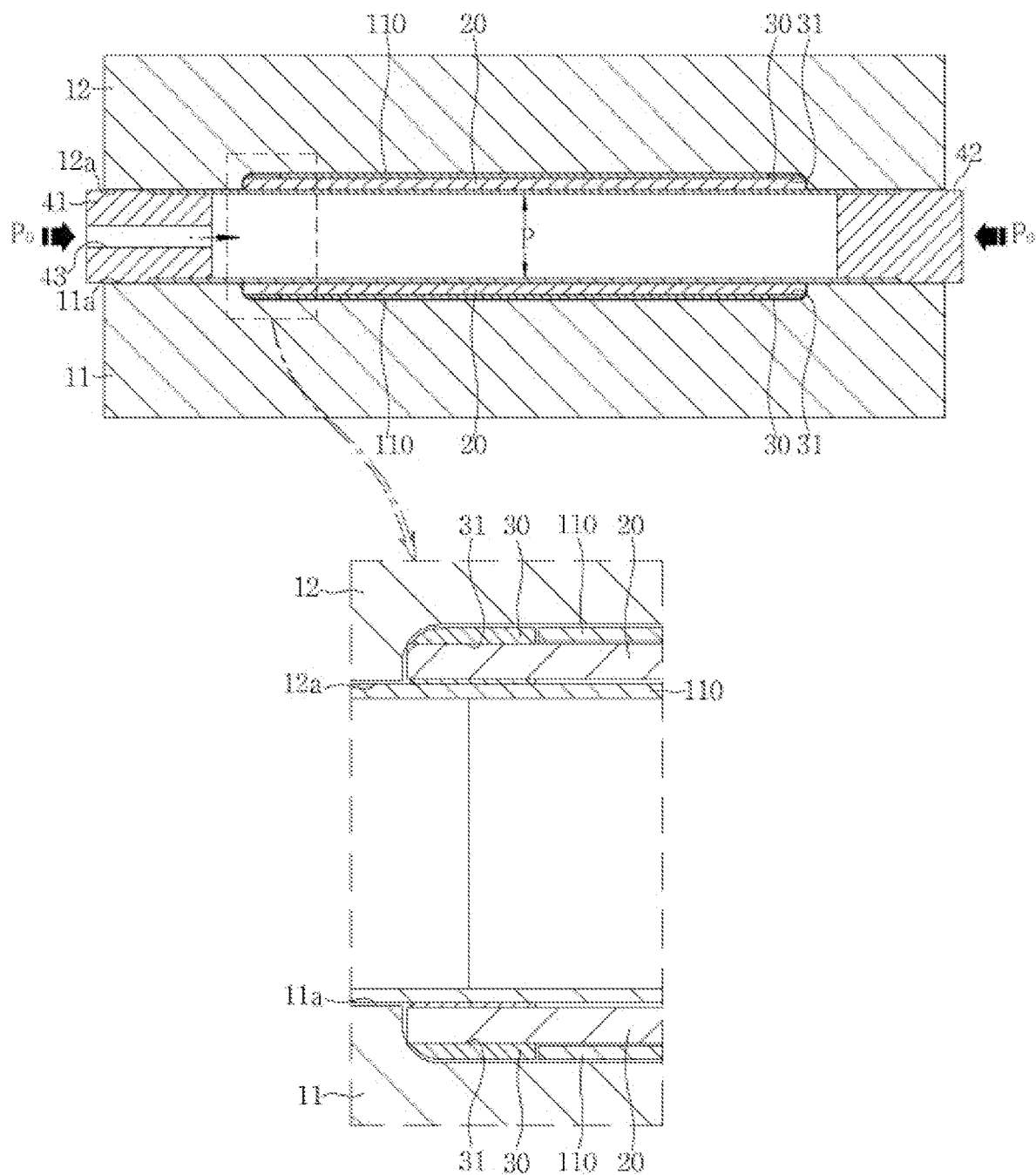
FIG. 6 is a cross-sectional view illustrating a state in which a hydroforming process proceeds in the hydroforming machine shown in FIG. 5.

FIGS. 5 and 6 illustrate an example of a configuration of a hydroforming machine configured to manufacture the double tube of the present disclosure, and the hydroforming machine includes molds 11 and 12, two bar holders 30, a first press punch 41, and a second press punch 42.

The molds 11 and 12 are parts in which hydroforming is performed, and respectively include cylindrical-shaped cavities 11a and 12a installed in a state in which an inner tube 120 is inserted into an outer tube 110, and a plurality of petal forming bars 20 are inserted between the inner tube 120 and the outer tube 110. The mold includes a lower mold 11 having a semi-cylindrical-shaped cavity 11a which is formed therein, and an upper mold 12 coupled to an upper portion of the lower mold 11 and having a semi-cylindrical-shaped cavity 12a corresponding to the cavity 11a of the lower mold 11.

Since an inner diameter of each of the cavities 11a and 12a substantially corresponds to an outer diameter of the outer tube 110, the outer tube 110 may be solidly supported in the cavities 11a and 12a without moving.

The bar holders 30 are paired, and are formed in a ring shape and inserted into both sides of the inner tube 120 to support both end portions of the petal forming bar 20. A plurality of holes 31 into which both end portions of the petal forming bar 20 are inserted and supported are formed in the bar holder 30 along a circumferential direction at predetermined intervals. Accordingly, when the hydroforming is performed, the plurality of petal forming bars 20 are maintained in a fixed state between the inner tube 120 and the outer tube 110 without moving.

The first press punch 41 and the second press punch 42 are each formed as a cylinder having a diameter substantially corresponding to the inner tube 120, and apply a pressure to both end portions of the inner tube 120 through openings of the bar holders 30 to compress the inner tube 120. In the first press punch 41, a fluid inlet 43 is formed to pass through in a longitudinal direction to supply a fluid to the space in the inner tube 120.

In a specific description of the method of manufacturing a double tube using the hydroforming machine, first, the inner tube 120 is inserted into the outer tube 110 and the outer tube 110 to be coaxially disposed (operation S1). Subsequently, the plurality of petal forming bars 20 are inserted into the space between the outer tube 110 and the inner tube 120, bar holders 30 are fitted into both sides of the inner tube 120, and then both end portions of the petal forming bars 20 are respectively inserted into the holes 31 of the bar holders 30 to be fixed (operation S2).

Subsequently, as described above, an assembly of the outer tube 110, the inner tube 120, and the petal forming bars 20 is seated in the cavity 11a of the lower mold 11 of the hydroforming machine, and then the upper mold 12 is coupled to an upper portion of the lower mold 11 (operation S3).

When the hydroforming process is ready to be performed through the above-described process, while a pressure is applied radially outward to an inner surface of the inner tube 120, the first press punch 41 and the second press punch 42 are pressed toward a center of a longitudinal direction of the inner tube 120 by supplying the fluid into the inner tube 120 through the fluid inlet 43 of the first press punch 41 by a predetermined pressure (operation S4).

When the pressure of the fluid and the pressure of the first press punch 41 and the second press punch 42 are applied to the inside of the inner tube 120, the inner tube 120 is radially expanded and deformed, and in this case, since the petal forming bars 20 are interposed between the inner tube 120 and the outer tube 110, the inner tube 120 is expanded and deformed on the basis of the petal forming bars 20. Accordingly, the inner tube 120 has the petal shape.

When the hydroforming is completed, the upper mold 12 and the lower mold 11 are separated and then the petal forming bars 20 are separated from the space between the outer tube 110 and the inner tube 120 (operation S5).

According to the present disclosure, since the inner tube 120 has the petal shape due to the hydroforming in the state in which the inner tube 120 is inserted into the outer tube 110, the double tube having the petal shape may be easily manufactured.

According to the present disclosure, since an inner tube has a corrugated petal shape and thus has a greater area in comparison with a conventional circular inner tube, heat exchange efficiency can be improved when fluids having different temperatures pass through the double tube to be heat-exchanged with each other.

Further, according to a method of manufacturing a double tube of the present disclosure, since the inner tube has a petal shape by hydroforming in a state of being inserted into the outer tube, a double tube having the petal shape can be easily manufactured.

In the above, although the present disclosure has been described in detail with reference to the embodiments, various substitutions, addition, and modifications may be performed by those skilled in the art within the above-described technical spirit, and the modifications should be interpreted as being included in the scope of the present disclosure determined by appended claims which will be described below.

What is claimed is:

1. A method of manufacturing a double tube using a hydroforming method, the double tube comprising:

an outer tube; and an inner tube coaxially inserted into the outer tube to be installed, and having a corrugated petal shape in a wave form along a circumferential direction;

the method comprising:

an operation of inserting the inner tube into the outer tube and coaxially disposing the inner tube and the outer tube (S1);

an operation of inserting a plurality of petal forming bars into a space between the outer tube and the inner tube and arranging the petal forming bars along a circumferential direction at predetermined intervals (S2);

an operation of disposing an assembly of the outer tube, the inner tube, and the petal forming bars in a mold of a hydroforming machine (S3);

an operation of supplying a fluid into the inner tube while applying a pressure to the inner tube in an axial direction to expand the inner tube (S4); and an operation of separating the petal forming bars from the space between the outer tube and the inner tube (S5).

2. The method of claim 1, wherein a pair of bar holders each having a ring shape and in which a plurality of holes into which both end portions of the petal forming bar are inserted are formed along a circumferential direction at predetermined intervals are inserted onto both sides of the inner tube, and both end portions of each of the plurality of petal forming bars are supported by a holder in the operation (S2).

3. The method of claim 1, wherein the petal forming bar is formed as a round rod-shaped bar having a diameter smaller than or equal to a difference between a diameter of the outer tube and a diameter of the inner tube.

\* \* \* \* \*